L. CHANDOR.
Making Sulphuric Acid.

No. 42,985.

Patented May 31, 1864.

Witnesses:

Inventor:

UNITED STATES PATENT OFFICE.

L. CHANDOR, OF ST. PETERSBURG, RUSSIA.

IMPROVEMENT IN THE MANUFACTURE OF SULPHURIC ACID.

Specification forming part of Letters Patent No. 42,985, dated May 31, 1864.

*To all whom it may concern:*

Be it known that I, L. CHANDOR, of St. Petersburg, in the Empire of Russia, have invented a new and useful Improvement in the Manufacture of Sulphuric Acid; and I do hereby declare that the following is a full, clear, and exact description of the same, reference being had to the accompanying drawings, forming a part of this specification, in which—

Figure 1:
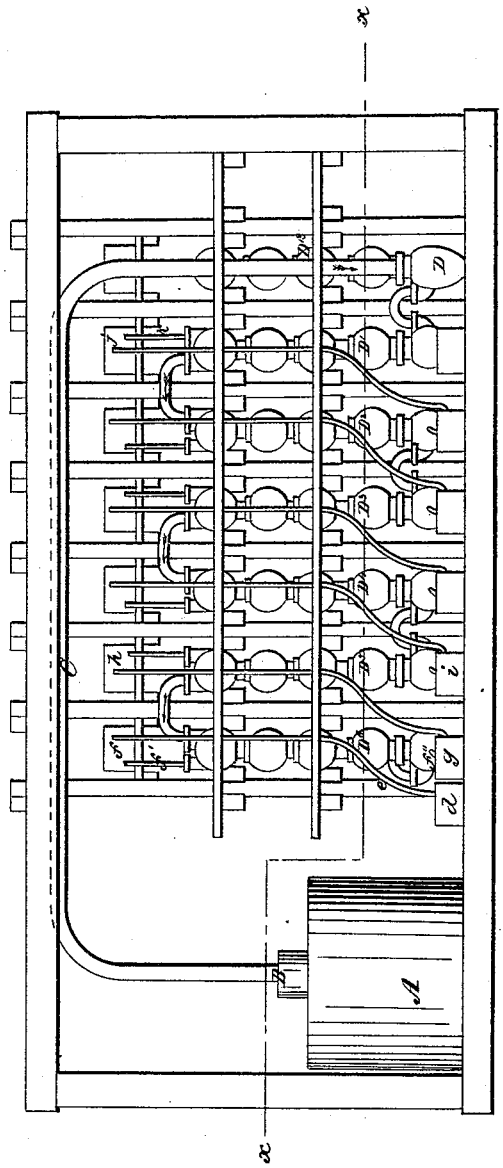
Figure 2:
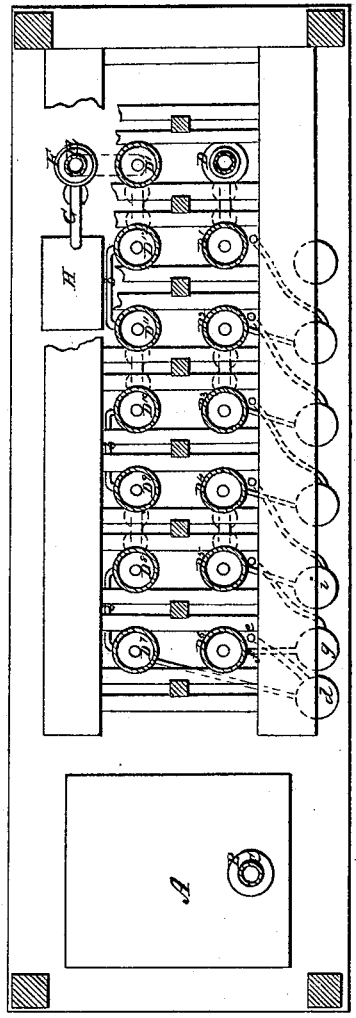

Figure 1 represents a front elevation of the apparatus which I employ in carrying out my invention. Fig. 2 is a horizontal section of the same, taken in the plane indicated by the line $xx$, Fig. 1.

Similar letters of reference in both views indicate corresponding parts.

The object of this invention is to facilitate the combination of the oxygen derived from nitrous fumes with the sulphurous-acid gas derived from burning sulphur or roasting pyrites or other sulphurets, and to save all the nitric oxide, and, by reconverting it into peroxide of nitrogen, render it fit for the oxidation of fresh charges of sulphurous-acid gas.

The nature of my invention and its peculiar advantages will be readily understood from the following description.

Until to a recent date sulphuric acid has been produced in all manufactories in lead chambers, the erection and preservation of which requires considerable capital. By my improved process the use of lead chambers is rendered superfluous and the price of my apparatus is moderate and the space required for it limited, so that the same becomes accessible to small manufacturers who may employ sulphuric acid in large quantities, and heretofore have been dependent entirely upon a few large manufactories for their supply.

My process is based on the principle that the combination of gases takes place in a small space under the influence of heat and in the presence of porous bodies, whereas in a lead chamber the gases come in contact solely by their respective vertigenous motion, and combine because they remain in contact for a considerable time in the same space. I use good burnt and waste coke as porous body, and a series of great bottles of burnt clay or stoneware for the retorts or chambers.

The sulphurous acid is produced by the burning of brimstone, pyrite, or other sulphureted ore. The burning takes place in an ordinary kiln, A, and in a similar kiln furnished with bowls nitrate of soda or saltpeter is decomposed by means of sulphuric acid. The gases rise through the pipe or chimney B, and pass through the pipe C to the first flask or vessel, D, and thence through the columns D' $D^2$ $D^3$, and so forth, each formed by 5 (more or less) flasks placed one on top of the other. The chimney B, pipe C, and flasks D D', &c., are all made of clay or stoneware, and the lowest flask in each column is filled with pieces of stone, which act as filters for the sulphuric acid, while the other flasks are filled three-quarters full with coke. The sulphurous and nitrous vapors pass from one column to the other, as indicated by the arrows, until they reach the column $D^{13}$, which is constantly supplied with a small quantity of sulphuric acid of 60° to 62° Baumé, in order to absorb the nitrous vapor which may escape the reaction. From the column $D^{13}$ the vapors pass through the pipe E into the flask F, in order to catch the last traces of acid, and finally through a pipe, G, and trunk H to the open air. The sulphuric acid obtained by these means is of different density in every column, according to its distance from the kilns. In order to obtain concentrated acid, the liquid obtained from the last columns is again let into the first, and to effect this purpose the columns $D^7$ $D^8$ $D^9$ $D^{10}$ $D^{11}$ are connected with each other by means of glass siphons $b$, and they are all supplied with a small continuous stream of water in order to catch the last traces of sulphurous acid vapors. The product of said columns flows by means of the siphon $b$ and pipe $c$ in a caldron, $d$, and as soon as this caldron is filled it is forced up by the pressure of the vapors through the pipe $e$ in the reservoir $f$; then the acid flows through pipe $f'$, column $D^6$, and pipe $f''$ to the caldron $g$, whence it rises by the pressure of the vapors to the reservoir $h$ and descends through the column $D^5$ to the caldron $i$, and so forth until it finally reaches the reservoir $j$, whence it descends through the pipe $k$ into column D', and by that time it has already reached the density desired for commerce. Thus it will be seen that by my apparatus the weaker acid is lifted several times and returned to the columns nearest to the kilns, in order to increase its density.

The heat produced by the reaction is generally sufficient for the conversion of the sulphurous acid in sulphuric acid. Should, however, by some reason the temperature in the columns sink down too low, the defect could be easily remedied by the introduction of steam from a suitable boiler.

Having thus fully described my invention, what I claim as new, and desire to secure by Letters Patent, is—

1. The employment or use of columns $D'$ $D^2$ $D^3$, &c., of flasks made of stoneware or clay, in combination with the kilns A, substantially as and for the purpose specified.

2. The use of coke, pumice stone, or other porous bodies, in combination with the columns $D'$ $D^2$ $D^3$ and kilns A, for the purpose set forth.

3. The caldrons $d$ $e$ $i$, &c., and reservoirs $f$, $h$, $j$, in combination with the columns $D^{13}$ $D^{12}$ $D^{11}$ $D'$, and kilns A, all constructed and operating in the manner and for the purpose herein shown and described.

L. CHANDOR.

Witnesses:
 WM. EDWIN PHELPS,
 HENRY BERGH,
  *Secretary of U. S. Legation.*